Patented Oct. 6, 1936

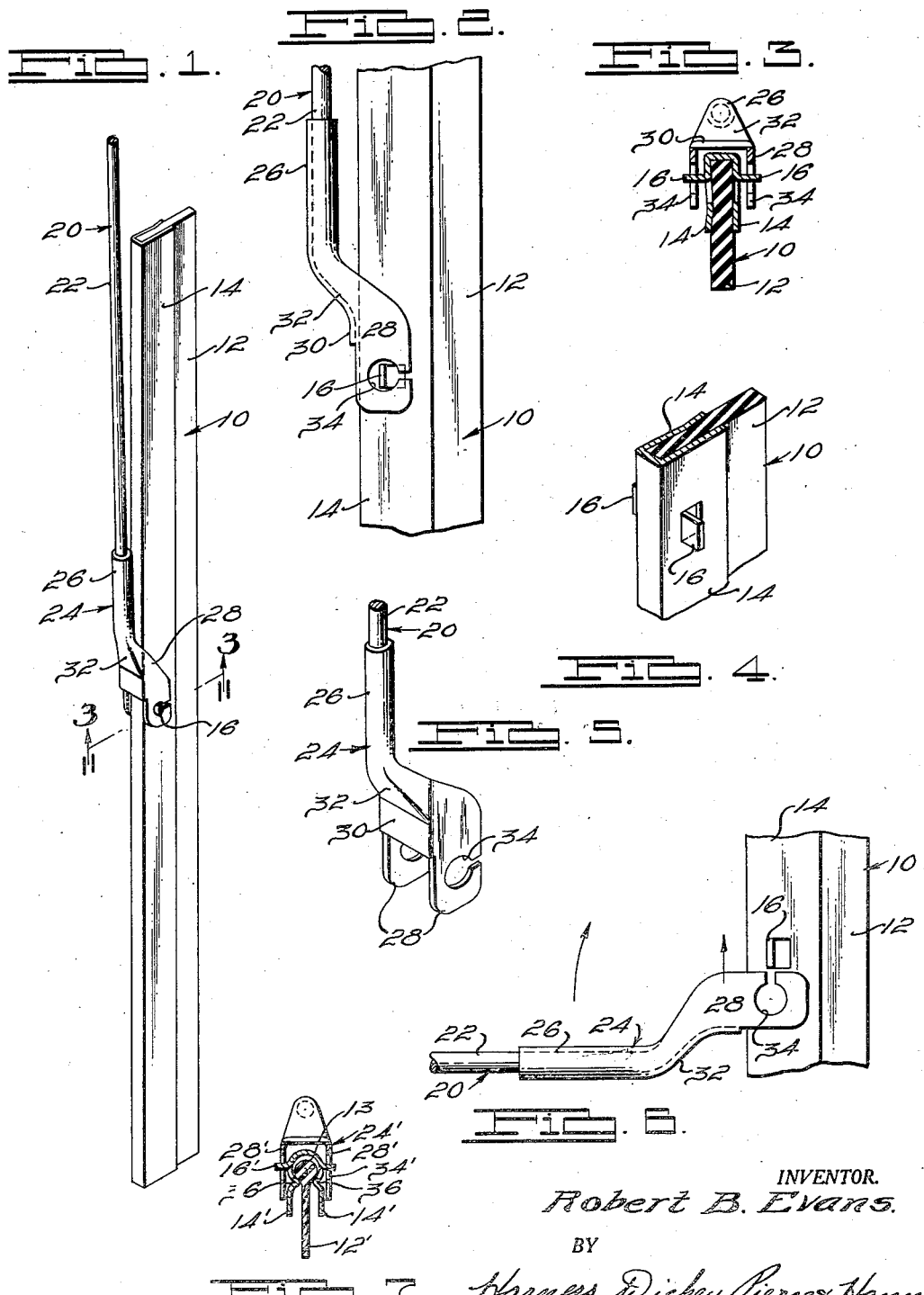

2,056,777

UNITED STATES PATENT OFFICE 2,056,777

WINDSHIELD WIPER BLADE AND ARM CONNECTION

Robert B. Evans, Detroit, Mich., assignor to E. S. Evans & Sons, a corporation of Michigan Application August 17, 1935, Serial No. 36,658

2 Claims. (Cl. 15—250)

This invention relates to a connection between the arm and wiper blade of a windshield wiper mechanism and has for its principal object the provision of such a connection that is simple in construction, economical to manufacture, efficient in operation and that will permit ready engagement and disengagement of the arm and blade without the necessity of any tools whatsoever.

Other objects of the invention are to provide a form of construction for connecting a windshield wiper arm to a wiper blade by means of which the proper relation between the arm and blade may be assured at all times and yet will permit separation thereof when desired with a minimum expenditure of effort and without the necessity of employing any tools or the like; to provide a connection between a windshield wiper arm element and a windshield wiper blade element in which one of the elements is provided with a key-hole slot therein and the other of the elements is provided with an elongated lug for passage into the slot in one direction and when turned relative to the slot for interlocking engagement therewith; to provide a windshield wiper arm and blade connection including a pair of spaced flanges fixed relative to the free end of the wiper arm and adapted to straddle the wiper blade, the flanges being provided with keyhole slots therein, and the wiper blade being provided with corresponding outwardly projecting lugs adapted for interengagement with the walls of the slot.

The above being among the objects of the present invention the same consists in certain novel features of construction and combinations of parts to be hereinafter described with reference to the accompanying drawing, and then claimed, having the above and other objects in view.

In the accompanying drawing which illustrates suitable embodiments of the present invention and in which like numerals refer to like parts throughout the several different views, Fig. 1 is a perspective view of a windshield wiper arm and wiper blade having a connection between them formed in accordance with the present invention;

Fig. 2 is an enlarged fragmentary side elevational view of the construction shown in Fig. 1;

Fig. 3 is an enlarged transverse sectional view taken on the line 3—3 of Fig. 1;

Fig. 4 is an enlarged fragmentary perspective view of the wiper blade shown in Fig. 1, showing the outwardly projecting lugs thereon.

Fig. 5 is an enlarged perspective view of the connecting end of the windshield wiper arm shown in Fig. 1;

Fig. 6 is a fragmentary side elevational view illustrating the method of assembling and disassembling the windshield wiper arm and blade shown in the previous views;

Fig. 7 is a view similar to Fig. 3 but illustrating a modified form of construction.

Referring to the drawing and particularly Figs. 1 to 6 thereof, a windshield wiper blade is indicated generally at 10, and while in the broader aspects of the present invention any suitable type of windshield wiper blade may be employed, that shown is conventional and includes an elongated strip 12 of rubber forming the wiping element and having one longitudinal margin thereof clamped within the U sectioned sheet metal member 14 which is conventionally called a backing member. As is generally understood the free marginal edge of the wiping element 12 is adapted to be drawn back and forth across the face of a windshield in order to clear the front area of the windshield of water, snow or other foreign material. The backing member is provided for imparting the necessary rigidity to the wiping element 12 and providing a means of connecting it to an operating arm.

In accordance with the present invention a lug 16 projects outwardly from each side of the wiper blade 10 preferably adjacent the midpoint of the length thereof. As will be noted each of the lugs 16 is of greater width than thickness and the reason for this will be hereinafter apparent. Although in the broader aspects of the invention it makes no difference how the lugs 16 are formed or secured relative to the wiper blade 10, in the particular construction shown, which is perhaps the simplest and most economical, each lug 16 is formed by shearing the metal of the corresponding side of the backing member 14 along the sides and free end portion of the lug 16 and thereafter bending the lug 16 outwardly into generally perpendicular relationship with respect to the plane of such coresponding side. The method of forming the lugs 16 shown is particularly well brought out in Figs. 3 and 4.

Windshield wiper blades are conventionally caused to oscillate back and forth across the surface of a windshield by means of a windshield wiper motor (not shown) provided with an oscillating shaft (not shown) to which one end of a windshield wiper arm is secured for oscillatory movement therewith. The opposite or free end of such windshield wiper arm is secured to the windshield wiper blade so as to cause corresponding oscillation thereof. In the present instance the windshield wiper arm is indicated generally at 20 and in the illustrative embodiment shown comprises a cylindrical portion or rod 22 preferably formed from spring wire and an end connecting member indicated generally at 24. The end connecting member 24 is formed from a single piece of sheet metal and comprises a cylindrical neck portion 26 in which the corresponding end of the wire or rod 22 is received and fixed. The opposite end of the connecting member 24 is formed to provide two spaced parallel flange portions 28 integrally connected together by a cross-bar portion 30 and to the cylindrical portion 26 by the curved neck portion 32. It will be noted that the integral wall portion 30 extends over only a portion of the length of the flanges 28, the outer ends of the flanges being unconfined at opposite margins thereof. In the unconfined portions of each of the flanges 28 is formed a key-hole slot 34 which may open either on a side or the end margins of the flanges, but in the particular embodiment shown opens on to that marginal edge of the corresponding flange 28 opposite to the wall 30.

The flanges 28 are spaced from each other a sufficient distance so as to permit reception of the wiper blade 10 between them, the actual distance by which they are spaced being dependent upon the thickness of the wiper blade to be received between them and also depending upon whether or not it is desired to allow the wiper blade as a unit to have a flopping action between the flanges 28 or to be retained against such action therebetween. In the particular embodiment illustrated in Figs. 1 to 6, inclusive, it has been assumed that it is desired to permit the wiper blade 10 as a whole to flop between the flanges 28 and accordingly the flanges 28 are spaced with relation to the thickness of the wiper blade 10 as indicated in Fig. 3. The width of the narrow portion of the key-hole slots 34 is slightly in excess of the thickness of the lugs 16 which are adapted to be received therein, and as in the present case where to assume that the wiper blade 10 will flop within the connecting member 24 of the arm 20, the width of the key-hole slots 34 over the area of their maximum width will be in excess of the width of the corresponding lugs 16 so that the lugs may work in a diametrical direction in the slots 34 when the arm and blade are in properly assembled relation as indicated best in Fig. 2.

As will be understood from the foregoing description when it is desired to assemble the blade 10 to the arm 20, the blade and arm are positioned in approximately perpendicular relationship with respect to each other as indicated in Fig. 6, the backing member 14 of the blade 10 is inserted between the protecting end portions of the flanges 28 as indicated in Fig. 6, the wiper blade is then advanced relative to the arm so as to cause the lugs 16 to be introduced through the narrow portions of the slots 34 until the lugs are within the large portion of the slots 34, and then the blade 10 and arm 20 are pivoted relative to one another about the lugs 16 until the blade and arm reach approximately their normal operating position shown in Fig. 1, at which time the resulting interengagement of the lugs 16 and the margins of the slots 34 retain the blade and arm against separation.

As previously noted, in view of the fact that in the construction shown in Figs. 1 to 6, inclusive, the flanges 28 are spaced from one another by a distance greater than the thickness of the backing member 14 of the blade 10 and the lugs 16 are of less width than the corresponding portion of the slot 34 when in finally assembled relationship, the lugs 16 may work up and down in the slots 34 and permit the wiper blade 10 to flop as its direction of movement across the face of the windshield is reversed so as to get the desired wiping action. where this flopping action of the entire blade is not desired it may be preevnted in either one of two different ways, one of which obviously is to make the width of the lugs 16 substantially equal to the maximum width of the slot 34 which, when the enlarged portions of the slot are of circular formation as indicated, will effectively prevent any substantial movement of the lugs 16 in a direction diametrically of the slot 34 when in finally assembled relationship with respect thereto. The second method is disclosed in Fig. 7.

Referring to Fig. 7 which is a section similar to Fig. 3 but showing a modification thereof, the end connecting member indicated generally at 24′ is provided with flanges 28′ corresponding to flanges 28 previously described but in this case are spaced closer together so as to substantially contact opposite sides of the backing member 14′ corresponding to the backing member 14 previously described, so as to prevent substantial flopping action of the backing member 14′ therebetween. The backing member 14′ in this case is provided intermediate its closed edge and its open edge with opposed inwardly extending beads 36. The wiping element 12′ in this case is provided with an enlarged marginal portion 13, preferably of greater width than the distance between the beads 36 and of less width than the interior width of the backing member 14′ and such marginal edge portion 13 is received within the backing member 14′ between the bottom of the channel thereof and the ribs 36, the main body portion of the wiping element projecting outwardly beyond the open edge of the backing member 14 as indicated. Thus in this construction the wiping element 12′ may be flopped relative to the backing member 14′ and this eleminates the necessity of providing a flopping action between the backing member 14′ and the flange 28′. It may be noted, as it is intended to be understood, that the backing member 14′ is provided with outwardly projecting lugs 16′ corresponding to the lugs 16 previously described and the flanges 28′ are provided with corresponding key-hole slots 34′ corresponding to the slots 34 previously described. The lugs 16′ may be considered to be substantially the same width as the maximum width of the slots 34′, as previously mentioned, to further guard against flopping of the backing member 14′ relative to the flanges 28′.

From the foregoing it will be understood that in accordance with the present invention the wiper blade member and the wiper arm member are provided with inter-engaging key-hole slots and lugs so constructed and arranged that by rotating one of the members substantially 90° out of its normal operative position with respect to the other member it may be engaged or dis-engaged from the other member in a quick and ready manner and without the necessity of any tools whatsoever, and that when the parts assume their normal operative relation with respect to each other the connection between them afforded by the inter-engagement of the key-hole slots and lugs is such as to effectively maintain the relative positions of said members during operation.

Formal changes may be made in the specific embodiment of the invention described without departing from the spirit or substance of the broad invention, the scope of which is commensurate with the appended claims.

What is claimed is:

1. In combination, a windshield wiper blade having an elongated lug projecting from one side thereof, a windshield wiper arm of channel shape provided with opposed flanges adapted to receive said blade therebetween, and an extension at the outer end of one of said flanges having a keyhole slot therein, said keyhole slot and said lug being so constructed and arranged relative to each other that when said arm and blade are in non-operative position with respect to each other, said lug is insertible into and removable from said slot.

2. In combination, a windshield wiper blade having an elongated lug projecting from each side thereof, a windshield wiper arm of channel shape having a pair of flanges adapted to receive said blade therebetween, each of said flanges being provided with an extension formed at the outer end thereof and having a keyhole slot therein, said keyhole slots and said lugs being so constructed and arranged that when said blade and arm are in non-operative position with respect to each other, said lugs are insertible into and removable from said slots.

ROBERT B. EVANS.